United States Patent [19]
Kress

[11] Patent Number: 5,644,926
[45] Date of Patent: Jul. 8, 1997

[54] TWO-PIECE SCRAPING BLADE CONSTRUCTION

[75] Inventor: John E. Kress, Waterloo, Wis.

[73] Assignee: APV Crepaco, Inc., Rosemont, Ill.

[21] Appl. No.: 538,364

[22] Filed: Oct. 3, 1995

Related U.S. Application Data

[63] Continuation-in-part of Ser. No. 396,553, Mar. 1, 1995, and a continuation-in-part of Ser. No. 495,331, Jun. 27, 1995.

[51] Int. Cl.⁶ ............................................. A23G 9/16
[52] U.S. Cl. ..................... 62/342; 15/236.1; 366/309
[58] Field of Search ................ 62/342, 343; 15/104.09, 15/104.096, 236.1, 246.5; 366/309, 311, 312, 313; 165/94

[56] References Cited

U.S. PATENT DOCUMENTS

| | | |
|---|---|---|
| 1,742,171 | 12/1929 | Vogt . |
| 1,934,283 | 11/1933 | Thompson ............................ 366/309 |
| 2,263,794 | 11/1941 | Wyen . |
| 2,366,131 | 12/1944 | Spaulding ........................... 15/104.09 |
| 2,535,462 | 12/1950 | Stoelting et al. ..................... 366/313 |
| 2,746,730 | 5/1956 | Swenson et al. ..................... 366/311 |
| 2,810,557 | 10/1957 | Phelan ................................ 366/313 |
| 2,975,617 | 3/1961 | Wakeman . |
| 3,037,748 | 6/1962 | Wakeman . |
| 3,214,146 | 10/1965 | Wakeman et al. . |
| 4,129,389 | 12/1978 | Wakeman et al. . |
| 4,185,352 | 1/1980 | Smith .................................. 15/246.5 |
| 4,596,296 | 6/1986 | Matthias ............................. 175/379 |
| 4,783,875 | 11/1988 | Cottam .............................. 15/236.01 |
| 4,793,151 | 12/1988 | Masel et al. . |
| 5,012,548 | 5/1991 | Jeffries ............................... 15/308 |
| 5,024,066 | 6/1991 | Goavec . |
| 5,074,125 | 12/1991 | Schifferly ........................... 366/312 |
| 5,165,218 | 11/1992 | Callahan, Jr. . |
| 5,189,366 | 2/1993 | Mayo . |
| 5,201,861 | 4/1993 | Menzel . |
| 5,306,466 | 4/1994 | Goldsmith . |

FOREIGN PATENT DOCUMENTS 2522129  8/1983  France ..................... 165/94

*Primary Examiner*—William E. Tapolcai
*Attorney, Agent, or Firm*—Leydig, Voit & Mayer, Ltd.

[57] ABSTRACT

A two-piece blade for use in a scraped surface heat exchanger comprising a larger plastic frame constructed of a plastic material component mixed with a metal component whose presence within a food product is detectable with conventional metal detecting equipment and a smaller metal edge that is substantially self-sharpening and replaceable.

14 Claims, 3 Drawing Sheets

TWO-PIECE SCRAPING BLADE CONSTRUCTION

REFERENCE TO RELATED APPLICATIONS

This is a continuation-in-part of application Ser. No. 08/396,553, filed Mar. 1, 1995, and also a continuation-in-part of application Ser. No. 08/495,331, filed Jun. 27, 1995. The subject matter of each of these applications is incorporated herein by reference.

FIELD OF THE INVENTION

This invention relates to blades used for engagement with scraped surface heat exchangers, and more particularly, to two-piece blade construction used for scraping the surface of a heat exchangers. The invention has particular application in the production of food product.

BACKGROUND OF THE INVENTION

Conventional scraped surface heat exchangers are utilized in various food processing applications. For example, equipment of this general type may include refrigeration systems or other systems having a heat exchange surface used in the continuous production of food product such as ice cream, other frozen desserts, frostings and crystallized oils. For example, the refrigeration system used for production of frozen desserts typically comprises an elongated freezing cylinder with an interior heat exchange surface and a dasher assembly disposed with attached blades disposed proximate to the heat exchange surface. The dasher assembly is rotated by a dasher motor drive so that the attached blades scrape ice crystals off the interior wall of the freezing cylinder. In the production of other food products, sugar crystals or fat crystals are scraped from the heat exchange surface.

In order to process frozen food product, the scraped surface heat exchanger receives unfrozen product mix from an inlet section and provides processed product through an outlet section to a filler. Typically, the freezing cylinder is initially filled with unfrozen product mix. Next, the refrigeration system surrounding the freezing cylinder is started. Once the freezing cylinder is filled and the refrigeration process has begun, the dasher assembly rotated in order to both mix the product and to introduce ice crystals that are formed on the freezing cylinder wall into the product mix.

The decreasing temperature and the introduction of the ice crystals both act to increase the viscosity of the product mix. Accordingly, the equipment utilized must have sufficient strength to withstand relatively high torque forces caused when the flowing product exceeds a certain amount. In addition, the equipment must be particularly durable to accommodate the scraping of ice crystals formed on the heat exchange surface.

For this reason, scraping blades attached to the outer periphery of the dasher assembly in known arrangements are fabricated of metal such as stainless steel. Although the use of plastic blades would be desirable since they offer a cost advantage over metal blades, plastic blades cannot be used to engage the heat exchange surface for scraping applications such as where ice crystals are formed on the inside surface of the freezing cylinder. In addition, the use of known plastic blade arrangements would involve health risks when used in these types of applications. This is principally due to the difficulties in detecting the presence of such materials when they are accidentally introduced into the food product.

The use of metal blades, however, also poses several shortcomings in known designs. As mentioned earlier, metal blades are rather costly and often difficult to fabricate. In addition, metal blade arrangements in known designs must frequently be resharpened in order to be effective in operation. This is particularly true in applications for producing frozen product since the blades continuously scrape the ice crystals off the inside of the freezing cylinder. Therefore, the production process must be frequently interrupted so that the metal blades can be removed, then resharpened either by hand or by machine, and then reinserted into the dasher assembly. This results in higher maintenance costs and increased production down time.

SUMMARY OF THE INVENTION

Accordingly, it is a primary object of the present invention to overcome the deficiencies of existing equipment of this general type.

It is an additional object of the present invention to provide a scraper blade arrangement with a reduced material cost.

It is another object of the present invention to provide a scraper blade that has low maintenance costs.

It is an additional object to provide a blade that addresses safety needs in food applications.

The present invention provides these and other additional objects and advantages with a two-piece scraper blade construction for use in a scraped surface heat exchanger. The scraper blade comprises a first plastic frame piece and a second metal edge piece of reduced thickness that is attached to the plastic frame. In operation, the metal edge frictionally engages the surface of the heat exchanger. The abrasion of the reduced thickness metal edge due to the frictional engagement thereof with the surface of the heat exchanger maintains the sharpness of the blade. Accordingly, the metal edge is substantially self-sharpening.

The scraper blade construction according to the invention has a reduced material cost since, in its preferred embodiment, a substantial portion of the blade is fabricated of plastic. In addition, the frame piece in one preferred embodiment is fabricated of a mixture of a plastic material and a metal constituent so that the resulting frame piece can be readily detected with conventional metal detecting equipment. This avoids the risk of introduction of broken piece fragments into the food product. However, since the plastic frame piece does not actually engage the heat transfer surface, the probability of its breakage is reduced. Due to its reduced cost, the two-piece blade construction is easily removed and discarded when the metal edge becomes worn. This likewise avoids the likelihood of breakage of the plastic frame piece.

DESCRIPTION OF THE PREFERRED EMBODIMENTS

Generally, the present invention relates to a two-piece scraper blade construction for scraping the heat exchange surface of a scraped surface heat exchanger. The invention has particular use in the production of frozen deserts and the like or in other food processing applications such as the production of frostings and crystallized oils. Those skilled in the art, however, will appreciate that the invention may be used in other applications as well, particularly upon consideration of the teachings herein. The scraper blade comprises a plastic frame piece and a reduced thickness metal edge that contacts the heat exchange surface. This two-piece blade construction is relatively low in cost, is easily replaceable, and adequately addresses safety concerns in commercial food processing applications.

Figure 1:
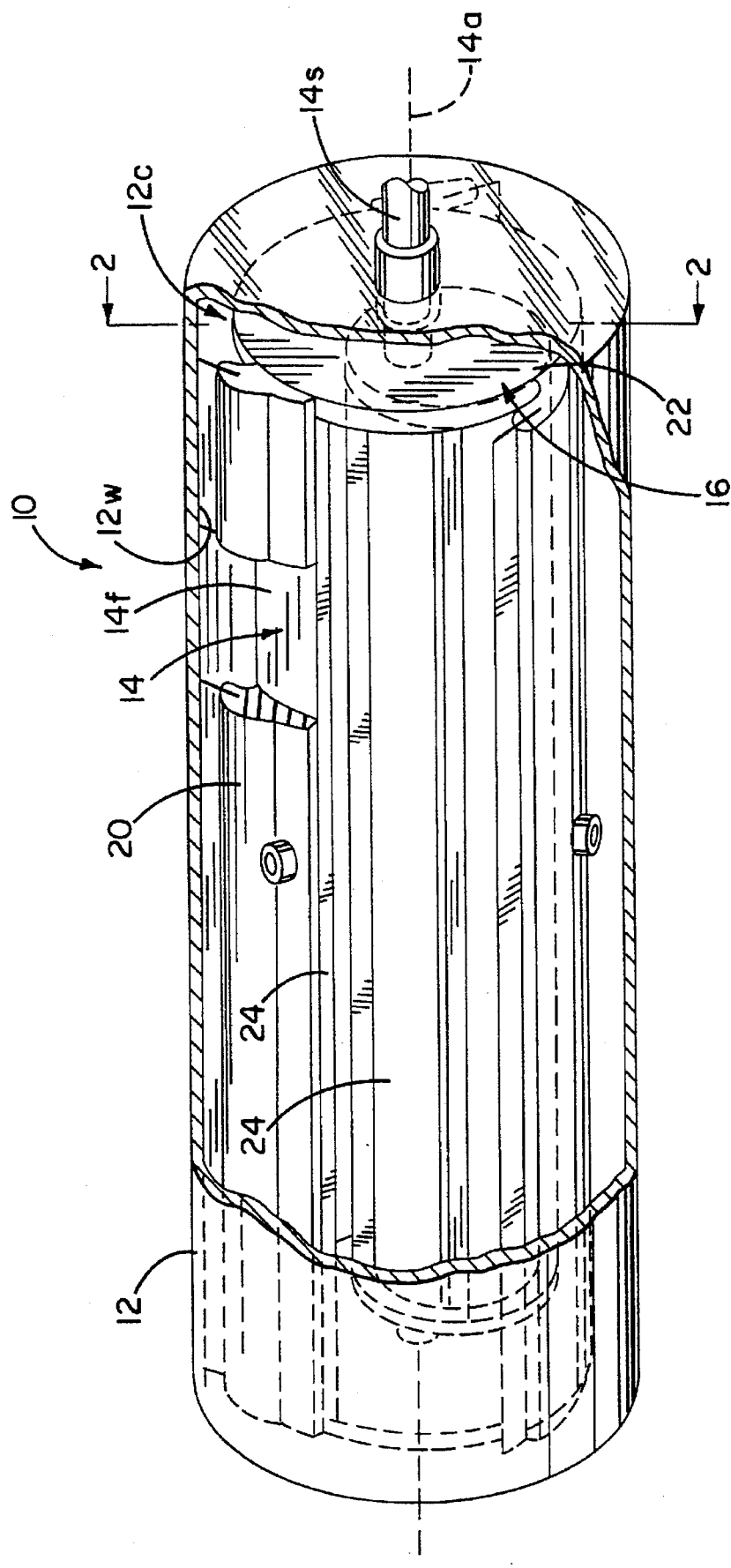
FIG. 1 is a perspective view of a scraped surface heat exchanger with portions cutaway to illustrate a two-piece scraper blade according to the present invention.

FIG. 1 illustrates one form of a scraped surface heat exchanger 10 comprising an elongated, generally cylindrical freezing cylinder 12. The freezing cylinder 12 is surrounded by conventional refrigeration apparatus (not shown) for continuously processing viscous food product as will be understood by those skilled in the art. The freezing cylinder 12 includes an inner cylinder wall 12w that provides a heat transfer surface and also defines a freezing chamber 12c through which the viscous product travels. The cylinder 12 includes other features that are adapted for use in the commercial production of frozen or semi-frozen desert products such as ice cream.

Figures 2, 3:
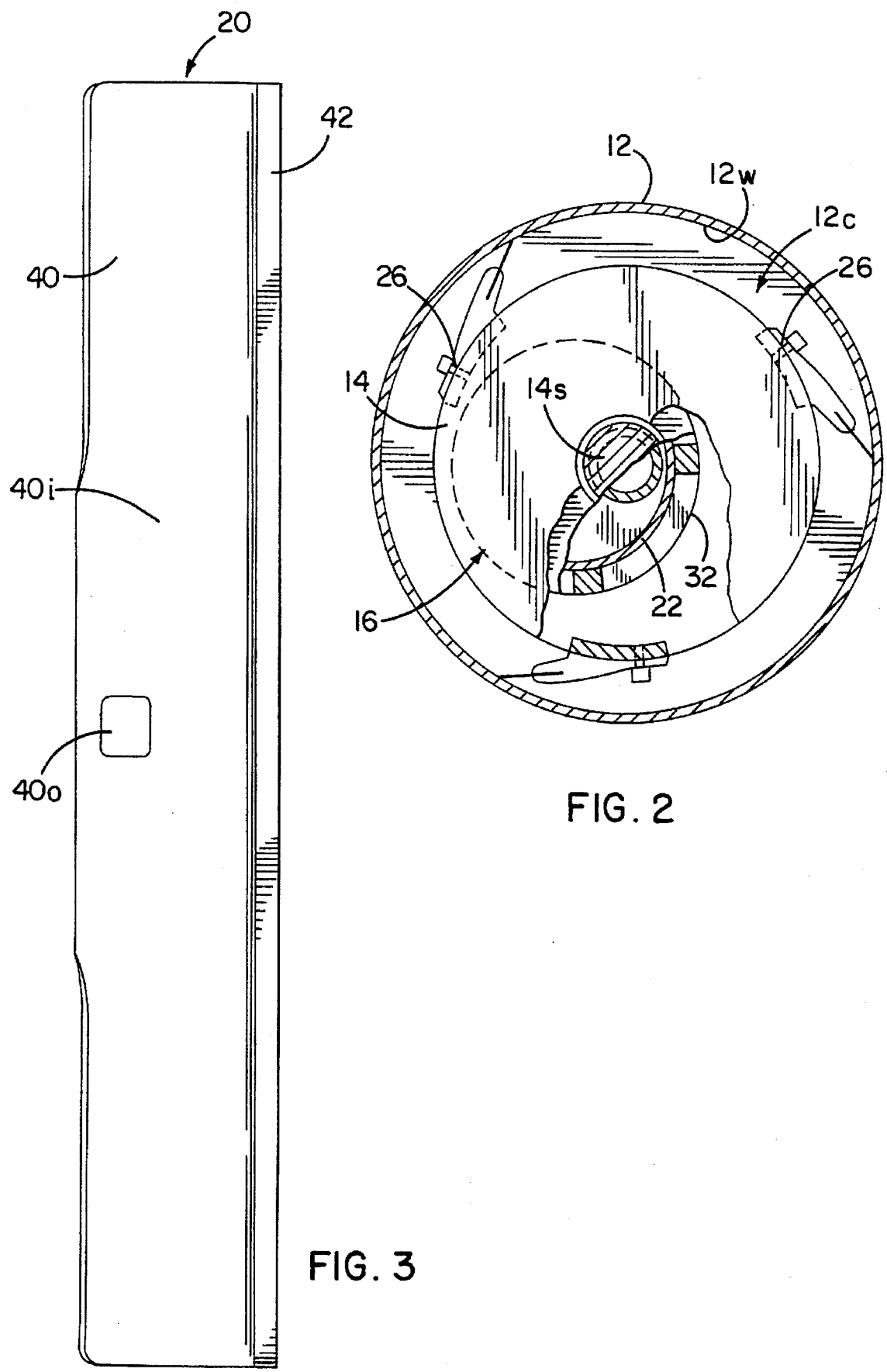
FIG. 2 is a sectional view taken along line 2—2 in FIG. 1 showing the scraped surface heat exchanger of FIG. 1.
FIG. 3 is a side view of the two-piece scraper blade according to the present invention.

FIGS. 1 and 2 also illustrates a dasher assembly 14 and an agitator 16 disposed within the freezing cylinder chamber 12c. The basic structural components of the dasher assembly 14 and the agitator 16 are disclosed in U.S. Pat. No. 4,129,389, the subject matter of which is incorporated herein by reference. As shown in FIGS. 1 and 2, the dasher assembly 14 comprises a skeletal frame section 14f that is fixedly connected to a rotary shaft 14s. The shaft 14s, in turn, is driven by a suitable drive mechanism (not shown) to rotate the dasher assembly about an axis 14a.

The dasher assembly 14 includes a plurality of spaced two-piece scraper blades 20 constructed according to the present invention that are located at spaced locations about the periphery of the skeletal frame section 14f. Each of the scraper blades 20 contact the freezing cylinder inner wall 12w in scraping engagement when the dasher assembly 12 is rotated about axis 14a, as discussed in greater detail below.

The agitator 16 is disposed within the skeletal frame section 14f of the dasher assembly. In this regard, the agitator 16 includes an elongate solid cylindrical support unit 22 which is fixedly mounted within the skeletal frame section 14f. In the preferred embodiment, the central longitudinal axis of the support unit 22 is laterally offset with respect to the rotary axis 14a of the dasher assembly 14 and the central longitudinal axis of the freezing cylinder 12. An elongated cagelike member 32 is mounted in encompassing relation on the exterior of the support unit 22. The cagelike member 32 includes a pair of axially aligned longitudinally spaced ring pieces 38 that are interconnected to one another by a plurality of symmetrically arranged rodlike elements 34, as best shown in FIG. 2. The cagelike member 32 rotates independently with respect to the support unit 22. The rotation of the cagelike member 32 is caused by the rotation of the dasher assembly 14 and the movement of the product within the freezing cylinder 12. In this manner, the cagelike member 32 helps the product move around the solid support unit 22 thereby facilitating kneading of the product mix.

The skeletal frame section 14f has a plurality of symmetrically arranged solid elongate ribs 24, as best shown in FIG. 1. The exterior of each rib 24 is provided with a plurality of longitudinally spaced outwardly projecting posts 26 which engage and support the blades 20. As depicted in FIG. 2, the blades 20 project angularly outward from the ribs 24 and the outer edge of each blade is in scraping engagement with the interior surface of the freezing cylinder 12. In operation, the blades 20 remove freezing product and ice crystals from the interior wall of the freezing cylinder 12. In addition, the blades 20 direct the product inward towards the rotary axis of the dasher assembly 14 and thus causing constant movement or kneading of the product mix. Movement of the product mix past and through the ribs 24 can be facilitated by providing each rib with one or more elongated openings.

Figure 4:
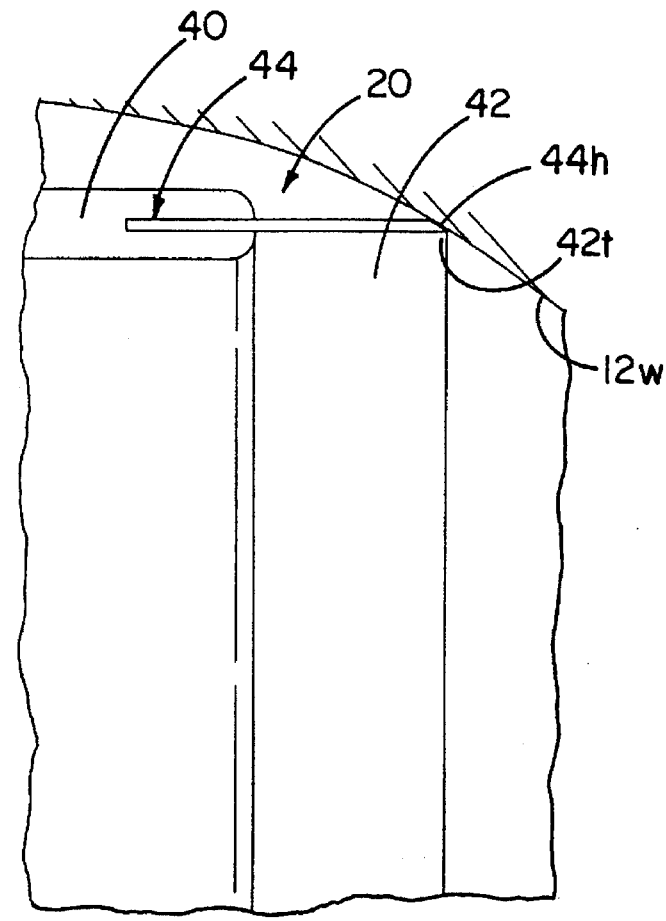
FIG. 4 is a fragmentary perspective view of the two-piece scraper blade shown in FIG. 3.
Figure 5:
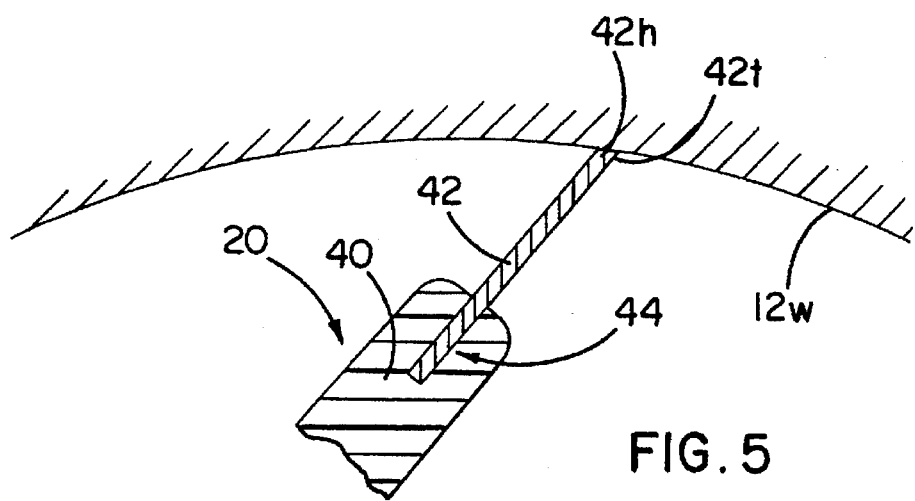
FIG. 5 is a sectional view of the two-piece scraper blade of FIG. 3.

The details of the two-piece scraper blade construction according to the present invention are shown in FIGS. 3 and 4. In particular, each of the plurality of blades 20 preferably includes an elongated plastic frame piece 40 and a reduced thickness metal edge 42. The plastic frame piece 40 has an opening 40o formed near its center that is sized to receive a suitable fastening means. In this way, each of the scraper blades 20 is secured to a respective one of the elongate ribs 24 of the skeletal frame section 14f. As shown in FIGS. 1 and 2, the plastic frame piece 40 is connected to the skeletal frame section 14f with a snap-in arrangement that uses posts 26 projecting outwardly from the surface of the elongated ribs 24. In this regard, the plastic frame piece 40 may include an increased thickness portion 40i (see FIG. 3) in the central section of the blade 20. Other suitable connecting devices may also be utilized. For example, the plastic frame piece 40 may be connected to the elongate rib 24 with quick-disconnect means so that the blades may readily be removed and discarded. The remaining blades 20 shown in FIGS. 1 and 2 are similarly connected.

The plastic frame piece 40 extends angularly away from the elongate rib 24 so that the outer edge of the plastic frame is proximate to the inside surface of the freezing cylinder 12. Further, the plastic frame 40 is formed with a sufficient thickness to prevent flexing and breakage when subjected to the torque forces that are typically encountered in this type of application. In the preferred embodiment, the thickness of the plastic frame section is approximately 0.2 inches, for a frame section 9 inches long by 1.5 inches in width. Thus, the overall cost of the scraper blade is substantially reduced with the use of a blade that is primarily composed of plastic.

In one preferred embodiment, the outer edge of the plastic frame 40 is slightly beveled and includes a longitudinally extending slot 44 formed therein adapted to receive and fixedly engage the metal edge 42. The slot 44 is of a sufficient depth to ensure that the interconnection between the plastic frame 40 and the metal edge 42 is strong enough to withstand the flexing force generated in the blade 20 when the blade scrapes the interior of the freezing cylinder 12. In this embodiment, the metal edge 42 is secured within the slot 44 with epoxy.

Alternatively, the metal edge 42 may be located within the slot 44 by molding a polymeric material which will form the plastic frame section 40 in surrounding relation to a pre-manufactured metal edge mounted within a plastic mold. This alternative embodiment reduces the manufacturing steps required.

The details of the reduced thickness metal edge 42 are best seen in FIGS. 3 and 4. As shown in FIG. 4, the metal edge includes a heel 42h which is in scraping engagement with the interior of the freezing cylinder 12. The heel 42h is slightly angled to present a tip 42t on its leading edge. As previously mentioned, the plastic frame 40 extends from the skeletal frame to nearly the inside wall of the freezing cylinder 12. Therefore, the metal edge 42 need only extend outwardly a relatively short distance from the bottom of the frame slot 44 to the inside wall of the freezing cylinder 12. As shown in FIG. 1, the metal edge 42 preferably longitudinally extends substantially the length of the elongate rib 24 in order to ensure that the blade scrapes the entire inside surface of the freezing cylinder 12. Of course, the invention may also be implemented as a plurality of spaced edges so long as the entire surface of the inner wall is scraped.

One important feature of this invention is the dimensions chosen for the metal edge 42. On the one hand, the metal edge 42 is formed with a sufficient thickness to resist flexing and to ensure its mechanical strength in column bending. On the other hand, the edge 42 has a reduced thickness to ensure that the heal created will not hinder the scraping ability of the blade construction to remove the ice crystals formed on the cylinder wall. This reduced thickness enables a metal edge fabricated of a work-hardened stainless steel such as a Sandvik material, type 7C27Mo2, to substantially self-sharpen when the dasher assembly 14 rotates due to the scraping action against the cylinder. The particles that are removed from the metal edge 42 to self-sharpen the edge during operation are of indistinguishable size which are typically present in commercial processing operations.

With this arrangement, the blade does not require periodic removal for resharpening and therefore avoids both the cost of maintenance and production down time associated with known arrangements. In the preferred embodiment, the metal edge has a thickness of between approximately 0.001 to 0.030 inches for an edge approximately 9 inches in length and 0.5 inches in width. Most preferably, the metal edge has a thickness of approximately 0.010 inches. This reduction in size of the metal edge 42 relative to the plastic frame section 40 likewise maximizes the reduction in cost of the overall scraper blade.

In order to meet safety concerns, the plastic frame section 40 is preferably fabricated using the method disclosed in applicants' U.S. patent application, Ser. No. 08/495,331 filed on Jun. 27, 1995 and entitled "Metallized Materials for Use in Food Processing." In particular, the plastic frame 40 comprises a first polymeric constituent and a second metal constituent that is detectable with conventional metal detecting equipment which is common in commercial food processing applications.

As explained in said application, the plastic frame section 40 is fabricated by first adding raw polymeric material to a conventional compounding machine. Next, a powdered metal material is added to the compounding machine during a melt process of the polymeric material. The compounding machine mixes the raw plastic and powdered metal in order to create a homogeneous mixture of plastic and powdered metal in which the powdered metal becomes imbedded in the interstices of the plastic material. The blend is then pelletized and supplied to a conventional injection molding machine which is used to from the plastic frame section 40. Therefore, if any fragments from the plastic frame 40 break off and are introduced into the food product during operation of the dasher assembly 14 they can be detected by conventional metal detecting equipment located downstream of the scraped surface heat exchanger 10. This allows the blade to be safely used in food processing applications. Preferably, the plastic frame 40 is formed by adding stainless steel powder to a polyoxylmethlyene copolymer at a rate of one percent to five percent by weight of the polyoxylmethlyene copolymer.

In operation of the dasher assembly and freezing cylinder, unprocessed product mix is introduced into the freezing cylinder 12 through an inlet (not shown). The dasher assembly 14 then begins to rotate. In this mode, the crystallization of moisture takes place on the freezing cylinder wall. The dasher assembly 14 both stirs the product mix contained in the freezing cylinder 12 while the two-piece blade scrapes ice crystals formed on the interior surface of the freezing cylinder 12. The cooling of the product mix and the introduction of the ice crystals combine to increase the viscosity of the product mix. The increasing viscosity of the product mix is detected by monitoring the load on the dasher motor (not shown) used to rotate the dasher assembly 14. The dasher motor load is monitored so that forward flow begins when the viscosity of the product exceeds a desired level.

The scraping action of the metal edge 42 against the freezing cylinder wall maintains the sharpness of the metal edge. That is, the reduced cross section of the metal edge 42 prevents dulling of the edge over periods of time since any removal thereof will result in a relatively sharp exposed portion. When the metal edge 42 becomes worn over extended periods of use, the two-piece blade is discarded and replaced. In contrast, prior scraper blade designs which were fabricated of sufficient strength to withstand the crystallization along the heat transfer cylinder wall now require regular maintenance in order to maintain the sharpness of the heel.

Accordingly, a two-piece scraper blade for use in a scraped surface heat exchanger has been described that meets the aforementioned objectives. The invention provides improved performance at significantly reduced material cost, while eliminating safety risks associated with prior designs.

While this invention has been described with an emphasis upon preferred embodiments, it will be apparent to those of ordinary skill in the art that variations of the preferred embodiments may be used, particularly upon consideration of the foregoing teachings. For example, the cross section of the metal edge 42 may be slightly beveled in order to present a sharp tip in scraping contact with the heat exchange surface while adding additional structural integrity to the blade construction so long as the edge cross section is sufficiently reduced to enable self sharpening. Those skilled in the art will appreciate that the invention is also not limited to the production of frozen food product. For example, the invention may also be used in conjunction with scraped surface heat exchanger equipment for the production of frostings or crystallized oils wherein sugar crystals or fat crystals are scraped from a heat exchange surface. Accordingly, this invention includes all modifications encompassed within the spirit and scope of the invention as defined by the appended claims.

What is claimed is:

1. A two-piece blade for use in a scraped surface heat exchanger including a heat exchange surface and an agitator in spaced relation to the heat exchange surface, the blade comprising:

an elongate plastic frame piece including a body portion connected to the agitator and a side edge proximate the heat exchange surface including a receiving slot; and a metal edge having a first portion received within the slot of the plastic frame piece and a reduced cross section outer heel in scraping engagement with the heat exchange surface.

2. The two-piece blade of claim 1 wherein the first portion of the metal edge is glued within the receiving slot.

3. The two-piece blade of claim 1 wherein the plastic frame piece is molded around the first portion of the metal edge.

4. The two-piece blade of claim 1 wherein the plastic piece comprises a first plastic material constituent and a second metal constituent that is detectable with a conventional metal detecting device.

5. The two-piece blade of claim 1 wherein the metal portion is powdered.

6. The two-piece blade of claim 1 wherein the heat exchange surface is the inside surface of an ice cream freezer.

7. A two-piece blade for use in freezing apparatus used in the production of frozen food product, the freezing apparatus including a freezing cylinder with an inner cylindrical wall defining a heat exchange surface, and a dasher assembly disposed within the freezing cylinder including a skeletal section with elongated ribs rotatably mounted on a dasher shaft adjacent to the heat exchanger surface, the blade comprising:

a plastic flame piece comprising a first plastic material constituent and a second metal constituent that is detectable with a conventional metal detecting device formed to provide an elongate body portion being releasably connected to the agitator and a side edge proximate the heat exchange surface including a receiving slot; and a metal edge having a first portion received within the slot of the plastic flame piece and an outer heel in scraping engagement with the heat exchange surface.

8. The two-piece blade of claim 7 wherein the first portion of the metal edge is glued within the receiving slot.

9. The two-piece blade of claim 7 wherein the plastic frame piece is molded around the first portion of the metal edge.

10. The two-piece blade of claim 7 wherein the metal edge is substantially self-sharpening.

11. The two-piece blade of claim 7 wherein the metal portion is powdered.

12. The two-piece blade of claim 11 wherein the metal edge is substantially self-sharpening.

13. A dasher assembly for use in conjunction with continuously fed freezing apparatus to produce frozen food product, the freezing apparatus including a freezing cylinder with an inner cylindrical wall defining a heat exchange surface, the dasher assembly comprising a skeletal section with elongated ribs rotatably mounted on a dasher shaft adjacent to the heat exchanger surface, and a plurality of dasher blades spaced about the periphery of the skeletal section, at least one of the dasher blades comprising a plastic flame piece including a body portion rigidly connected to the agitator and a side edge proximate the heat exchange surface including a receiving slot, and a reduced cross section metal edge having a first portion received within the slot of the plastic flame piece and an outer heel in scraping engagement with the heat exchange surface adapted to substantially self-sharpen as the dasher assembly is rotated.

14. A two-piece blade for use in a scraped surface heat exchanger including a heat exchange surface and an agitator in spaced relation to the heat exchange surface, the blade comprising:

a plastic frame piece including a body portion connected to the agitator and a side edge proximate the heat exchange surface including a receiving slot; and a metal edge having a first portion received within the slot of the plastic frame piece and an outer heel in scraping engagement with the heat exchange surface, the outer heel portion being of reduced cross section such that it is substantially self-sharpening when the agitator is rotated.

* * * * *